United States Patent
Okuda et al.

(10) Patent No.: US 9,994,253 B2
(45) Date of Patent: Jun. 12, 2018

(54) LANE KEEPING ASSIST APPARATUS (71) Applicant: TOYOTA JIDOSHA KABUSHIKI KAISHA, Toyota-shi (JP)

(72) Inventors: Yuji Okuda, Toyota (JP); Hidenobu Kinugasa, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 16 days.

(21) Appl. No.: 15/225,979

(22) Filed: Aug. 2, 2016

(65) Prior Publication Data
US 2017/0036694 A1 Feb. 9, 2017

(30) Foreign Application Priority Data

Aug. 7, 2015 (JP) .................................. 2015-156957

(51) Int. Cl.
*B62D 15/02* (2006.01)
*B62D 6/02* (2006.01)

(52) U.S. Cl.
CPC ............. *B62D 15/025* (2013.01); *B62D 6/02* (2013.01); *B62D 15/021* (2013.01)

(58) Field of Classification Search
CPC ....... B62D 15/025; B62D 6/02; B62D 15/021
See application file for complete search history.

(56) References Cited

U.S. PATENT DOCUMENTS

| 2007/0144824 | A1* | 6/2007 | Tamaki | B62D 5/0463 180/446 |
| 2008/0243339 | A1* | 10/2008 | Nishimori | B60G 7/003 701/41 |
| 2010/0250068 | A1* | 9/2010 | Yamazaki | B62D 6/001 701/41 |
| 2011/0257845 | A1* | 10/2011 | Niki | B62D 5/046 701/41 |

(Continued)

FOREIGN PATENT DOCUMENTS

CN 104417605 3/1815
DE 10 2009 003 147 A 11/2010

(Continued)

OTHER PUBLICATIONS

Office Action issued in corresponding German Patent Application No. 10 2016 114 525.4 dated Jan. 19, 2018, (with English translation).

*Primary Examiner* — Frederick M Brushaber
(74) *Attorney, Agent, or Firm* — Oblon, McClelland, Maier & Neustadt, L.L.P.

(57) ABSTRACT

A lane keeping assist apparatus has a vehicle speed responsive adjustment section which receives a target steering angle and a vehicle speed, sets a vehicle speed adjustment coefficient on the basis of the vehicle speed, multiplies an FF target steering torque by the vehicle speed adjustment coefficient, and outputs the resultant value as an adjusted FF target steering torque. The vehicle speed adjustment coefficient is set to 0 when the vehicle speed is lower than a first (Continued)

set vehicle speed and to 1 when the vehicle speed is higher than a second set vehicle speed. An adding section adds the adjusted FF target steering torque and an FB target steering torque together and outputs the resultant value as a final target steering torque.

2 Claims, 5 Drawing Sheets

(56) References Cited

U.S. PATENT DOCUMENTS

| | | | |
|---|---|---|---|
| 2011/0273310 A1* | 11/2011 | Kadowaki | B62D 15/0285 340/932.2 |
| 2015/0019082 A1* | 1/2015 | Inoue | B62D 1/286 701/41 |
| 2015/0057889 A1 | 2/2015 | Tamaizumi et al. | |

FOREIGN PATENT DOCUMENTS

| | | |
|---|---|---|
| JP | 2009-18626 | 1/2009 |
| JP | 2010-036755 A | 2/2010 |

* cited by examiner

LANE KEEPING ASSIST APPARATUS

BACKGROUND OF THE INVENTION

Field of the Invention

The present invention relates to a lane keeping assist apparatus for assisting a driver in driving a vehicle to keep in lane.

Description of the Related Art

Conventionally, a lane keeping assist apparatus which performs lane keeping assist control has been known (see, for example, Japanese Patent Application Laid-Open (kokai) No. 2009-18626). Such a lane keeping assist apparatus detects white lines on the left and right sides of a roadway using, for example, a camera sensor, and sets a target travel line within a lane (e.g., a line located at the midpoint between the left-hand and right-hand white lines) on the basis of the left-hand and right-hand white lines. The lane keeping assist apparatus calculates a target steering angle on the basis of the amount of deviation of the travel position (in the width direction) of a vehicle on which the apparatus is mounted from the target travel line and the angle of deviation of the heading direction of the vehicle with respect to the target travel line, and sends to a steering control apparatus a command signal which represents a target steering torque set on the basis of the target steering angle.

The steering control apparatus drives a motor in accordance with the target steering torque represented by the command signal from the lane keeping assist apparatus, to thereby cause a steering mechanism to generate the target steering torque. Thus, the steering angle is controlled such that the vehicle has a travel position near the target travel line. Accordingly, a driver can easily cause his/her vehicle to travel along a proper line within a lane.

In general, such a lane keeping assist apparatus performs the lane keeping assist control within a limited vehicle speed range; i.e., only during high speed travel. Therefore, a demand has arisen for expanding the vehicle speed range to the low speed side so as to perform the lane keeping assist control over the entire vehicle speed range. If the vehicle speed range within which the lane keeping assist control is performed is expanded to the low speed side in order to meet the demand, calculation of proper target steering torque becomes difficult during low speed travel for the following reason.

When the travel direction of the vehicle is to be changed, a lateral force (lateral acceleration) must be generated in the vehicle. When a steering force is applied to each steerable wheel, the tire of the steerable wheel has a slip angle. The lateral force is mainly generated by the tire. Specifically, the rubber of the tire deforms as a result of generation of the slip angle, and the rubber generates a restoring force to restore itself from the deformed state, whereby the lateral force is generated. However, during low speed travel, the slip angle becomes smaller than the slip angle generated during high speed travel. Also, self-aligning torque becomes hard to generate. Accordingly, the mechanism of generation of the lateral force changes between the case of high speed travel and the case of low speed travel, and thus, the relation between the applied steering torque and the generated lateral force changes between the two cases. Therefore, in the case where the target steering torque set on the basis of the target steering angle is used to control the motor during low speed travel in the same manner as that during high speed travel, steering torque which allows obtainment of proper lateral force cannot be generated. This results in a drop in lane keeping assist performance.

In the apparatus proposed in the Japanese Patent Application Laid-Open No. 2009-18626, a target lateral acceleration is calculated on the basis of the amount of deviation of the travel position (in the width direction) of a vehicle on which the apparatus is mounted from a target travel line, the angle of deviation of the heading direction of the vehicle with respect to the target travel line, and the curvature of the target travel line; and a target steering torque set on the basis of the target lateral acceleration is used as a feedforward control variable. In the apparatus, the actual lateral acceleration is calculated from the yaw rate of the vehicle detected by a yaw rate sensor, and a value obtained by multiplying the deviation of the actual lateral acceleration from the target lateral acceleration by a feedback gain is used as a feedback control variable. This apparatus calculates a final target steering torque by adding the feedforward control variable and the feedback control variable together.

However, the proposed apparatus also has the following problem. Since lateral force becomes hard to generate during low speed travel, even when the motor is controlled through use of the target steering torque as in the case of the high speed travel, proper lateral force cannot be generated, and lane keeping assist performance lowers.

SUMMARY OF THE INVENTION

The present invention has been accomplished so as to solve the above-described problem, and an object of the present invention is to allow lane keeping assist control to be performed well even in a low speed travel region.

In order to achieve the above-described object, the present invention provides a lane keeping assist apparatus for assisting driver's driving by causing a steering mechanism (60) to generate steering torque so as to cause a vehicle on which the apparatus is mounted to travel along a target travel line (Ld), comprising:

target steering angle calculation means (101) configured to calculate a target steering angle ($\theta s^*$) for causing the vehicle to travel along the target travel line (Ld);

feedforward control variable calculation means (102) configured to calculate, on the basis of the target steering angle ($\theta s^*$), an FF target steering torque (TFF*) which is a feedforward control variable adapted to high speed travel;

steering angle detection means (92) configured to detect an actual steering angle ($\theta s$) of the vehicle;

feedback control variable calculation means (105, 106) configured to calculate, on the basis of a deviation ($\Delta\theta s$) of the actual steering angle ($\theta s$) from the target steering angle ($\theta s^*$), an FB target steering torque (TFB*) which is a feedback control variable;

vehicle speed detection means (11) configured to detect a vehicle speed (Vx) of the vehicle;

feedforward control variable adjustment means (103) configured to adjust the FF target steering torque (TFF*) such that at a time of low speed travel during which the vehicle speed (Vx) is low, the FF target steering torque (TFF*) becomes smaller than the FF target steering torque (TFF*) at a time of high speed travel during which the vehicle speed (Vx) is high;

final control variable calculation means (104) configured to calculate a final target steering torque (T*) on the basis of the adjusted FF target steering torque (TFF*×Kv) and the FB target steering torque (TFB*); and torque generation means (70, 80, 90) configured to cause the steering mechanism (60) to generate the final target steering torque (T*).

The lane keeping assist apparatus of the present invention assists the driver's driving by causing the steering mechanism to generate steering torque so as to cause the vehicle on which the apparatus is mounted to travel along the target travel line. For such assistance, the lane keeping assist apparatus comprises the target steering angle calculation means, the feedforward control variable calculation means, the steering angle detection means, the feedback control variable calculation means, the vehicle speed detection means, the feedforward control variable adjustment means, the final control variable calculation means, and the torque generation means.

The target steering angle calculation means calculates a target steering angle for causing the vehicle to travel along the target travel line. For example, the target steering angle calculation means acquires the target travel line, and calculates the target steering angle on the basis of the amount of deviation of the travel position of the vehicle from the target travel line in the width direction, the angle of deviation of the heading direction of the vehicle from the target travel line, the shape of the target travel line, etc. The target travel line is set by using lane markers (e.g., left-hand and right-hand white lines) of a lane as a reference. The lane markers are recognized by, for example, a camera sensor which captures the image of a portion of the lane along which the vehicle is travelling, the portion being located ahead of the vehicle.

The feedforward control variable calculation means calculates, on the basis of the target steering angle, an FF target steering torque which is a feedforward control variable adapted to high speed travel. For example, the feedforward control variable calculation means calculates an FF target steering torque which increases with an increase in the target steering angle. "FF" is an abbreviation of feedforward. This FF target steering torque is a value adapted in a high speed travel range within which a fixed relation between the steering torque and the lateral force of the vehicle is maintained.

The steering angle detection means detects the actual steering angle of the vehicle. The feedback control variable calculation means calculates, on the basis of the deviation of the actual steering angle from the target steering angle, an FB target steering torque which is a feedback control variable. For example, the feedback control variable calculation means calculates the FB target steering torque by using a PID control equation, a PI control equation, a P control equation, or a like equation. "FB" is an abbreviation of feedback.

The lane keeping assist control controls the heading direction of the vehicle such that the vehicle travels along the target travel line. In this case, the heading direction of the vehicle can be changed by generating a lateral force at the tire of each steerable wheel. At the time of high speed travel, the lateral force has a characteristic of increasing in approximate proportion to the steering torque. However, at the time of low speed travel, the slip angle of the tire decreases, and the lateral force does not have the characteristic of changing in approximate proportion to the steering torque as in the case of the high speed travel. Therefore, at the time of low speed travel, a proper value of the FF target steering torque is not calculated.

In order to solve such a problem, the lane keeping assist apparatus of the present invention comprises the vehicle speed detection means and the feedforward control variable adjustment means as a configuration for adjusting the feedforward control variable. The vehicle speed detection means detects the vehicle speed of the vehicle. The feedforward control variable adjustment means adjusts the FF target steering torque such that at the time of low speed travel during which the vehicle speed is low, the FF target steering torque becomes smaller than the FF target steering torque at the time of high speed travel during which the vehicle speed is high.

The final control variable calculation means calculates a final target steering torque on the basis of the adjusted FF target steering torque and the FB target steering torque. For example, the final control variable calculation means calculates, as the final target steering torque, the sum of the FB target steering torque and the adjusted FF target steering torque. The torque generation means causes the steering mechanism to generate the final target steering torque. Accordingly, at the time of low speed travel, it becomes possible to perform lane keeping control by using mainly the FB target steering torque calculated by the feedback control variable calculation means. Also, at the time of high speed travel, it becomes possible to perform lane keeping control which is high in responsiveness by using the proper FF target steering torque and the FB target steering torque.

As a result, according to the present invention, the lane keeping assist control can be performed well even in the low speed travel range.

According to one aspect of the present invention, the feedforward control variable adjustment means (103) is configured to set the FF target steering torque (TFF*) to zero when the vehicle speed (Vx) is lower than a set vehicle speed (V1).

According to the one aspect of the present invention, the FF target steering torque is set to zero when the vehicle speed is lower than the set vehicle speed. Accordingly, at the time of low speed travel; i.e., when the vehicle speed is lower than the set vehicle speed, it is possible to calculate the final target steering torque on the basis of the FB target steering torque only. Thus, according to the one aspect of the present invention, at the time of low speed travel, the influence of feedforward control is eliminated, and the lane keeping assist control can be performed well even in the low speed travel range.

It should be noted that in the above description, in order to facilitate understanding of the invention, the constituent element of the invention corresponding to those of an embodiment of the invention are denoted by parenthesized symbols which are used in the embodiment; however, the constituent elements of the invention are not limited to those in the embodiment denoted by the symbols.

DESCRIPTION OF THE PREFERRED EMBODIMENTS

Figure 1:
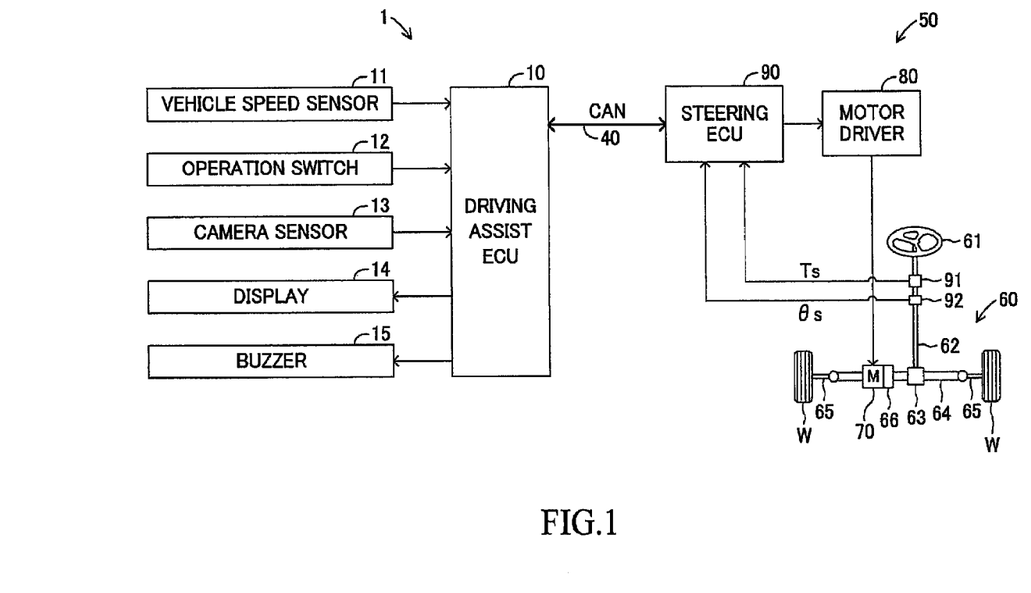
FIG. 1 is a schematic diagram of a lane keeping assist apparatus according to an embodiment of the present invention.

An embodiment of the present invention will be described in detail with reference to the drawings. FIG. 1 is a schematic diagram of a lane keeping assist apparatus according to the present embodiment.

The lane keeping assist apparatus of the present embodiment is composed of a lane keeping assist control section 1 and an electric power steering section 50. The lane keeping assist control section 1 includes a driving assist ECU 10. This driving assist ECU 10 is an electronic control unit for assisting driver's driving and includes a microcomputer as a main part. The driving assist ECU 10 performs lane keeping assist control. The lane keeping assist control is a control for applying steering torque to a steering mechanism 60 such that the travel position of a vehicle on which the lane keeping assist apparatus is mounted is maintained near a target travel line, to thereby assist steering operation performed by the driver. The driving assist ECU 10 utilizes a steering assist function of the electric power steering section 50 so as to perform the lane keeping assist control. In the present embodiment, the microcomputer includes a CPU and storage devices such as ROM and RAM, and the CPU realizes various functions by executing instructions or programs stored in the ROM. The ECU is the abbreviation for an electric control unit.

The electric power steering section 50 includes, as main parts, the above-mentioned steering mechanism 60 for steering steerable wheels W in accordance with steering operation of a steering wheel 61; a motor 70 which is incorporated into the steering mechanism 60 and generates steering assist torque; a motor driver 80 for driving the motor 70; and a steering ECU 90 for controlling the operation of the motor driver 80. The steering mechanism 60 includes a steering shaft 62, and the steering wheel 61 is connected to the upper end of the steering shaft 62 to be rotatable together with the steering shaft 62. A pinion gear 63 is connected to the lower end of the steering shaft 62 to be rotatable together with the steering shaft 62. The pinion gear 63 is in meshing engagement with rack teeth formed on a rack bar 64. Knuckles (not shown) of the steerable wheels W are steerably connected to opposite ends of the rack bar 64 through tie rods 65. Rotational motion of the steering shaft 62 about the axis thereof is converted to rectilinear motion of the rack bar 64 in the axial direction thereof, and the left and right steerable wheels W are steered leftward or rightward as a result of the rectilinear motion of the rack bar 64.

The motor 70 is assembled to the rack bar 64. The output shaft of the motor 70 is connected to the rack bar 64 through a ball-screw mechanism 66 in such a manner that power can be transmitted from the output shaft of the motor 70 to the rack bar 64. As a result of rotation of the output shaft of the motor 70, steering force is applied to the steerable wheels W, whereby the driver's steering operation is assisted. The ball-screw mechanism 66, which functions as a reducer and a rotation-to-linear motion converter, converts the rotational motion of the output shaft of the motor 70 to rectilinear motion, while reducing the rotational speed of the motor 70, and transmits the rectilinear motion to the rack bar 64.

A steering torque sensor 91 and a steering angle sensor 92 are provided on the steering shaft 62. The steering torque sensor 91 outputs a detection signal representing steering torque Ts. The steering torque sensor 91 detects, for example, the torsion angle of a torsion bar (not shown) disposed in an intermediate portion of the steering shaft 62 and detects the steering torque Ts from the torsion angle. The steering angle sensor 92 outputs a detection signal representing the steering angle $\theta$s of the steerable wheels W. The steering angle sensor 92 detects the rotational angle (rotational angle with respect to the neutral position) of the steering shaft 62 on the lower side of the torsion bar (not shown) where the steerable wheels W are present.

The signs (positive or negative) of the steering torque Ts and the steering angle $\theta$s show their directions. For example, a positive steering torque Ts represents a steering torque acting leftward, and a negative steering torque Ts represents a steering torque acting rightward. Similarly, a positive steering angle $\theta$s represents a steering angle in the leftward (counterclockwise) direction with respect to the neutral position, and a negative steering angle $\theta$s represents a steering angle in the rightward (clockwise) direction with respect to the neutral position. It should be noted that the magnitudes of the steering torque Ts and the steering angle $\theta$s are determined on the basis of their absolute values.

The steering ECU 90 includes a microcomputer as a main part. The steering ECU 90 is connected to the steering torque sensor 91 and the steering angle sensor 92 and receives the detection signals representing the steering torque Ts and the steering angle $\theta$s. The steering ECU 90 calculates a target current to be supplied to the motor 70 on the basis of the received detection signals such that an optimum steering assist torque corresponding to the driver's steering operation is obtained, and controls the operation of the motor driver 80 such that the target current flows through the motor 70.

Such a control operation for driving the motor 70 in response to an operation applied to the steering wheel by the driver (steering operation) to thereby facilitate the steering operation will be called "steering assist control." In the steering assist control, basically, a target assist torque is set such that the target assist torque increases with an increase in the steering torque Ts. If necessary, in order to improve steering feel, a compensation torque is set on the basis of the steering angle $\theta$s or the steering angular speed which is the differential value of the steering angle $\theta$s, and the compensation torque is added to the target assist torque.

The steering ECU 90 and the driving assist ECU 10 are connected to each other through a CAN (Controller Area Network) 40 in such a manner that data can be transmitted and received therebetween. When the steering ECU 90 receives a command for generating a torque for lane keeping (hereinafter referred to as the "lane keeping torque command") from the driving assist ECU 10, the steering ECU 90 drives the motor 70 to thereby generate a steering torque on the basis of a control variable (final target steering torque T* which will be described later) specified by the lane keeping torque command. In this case, unlike the case of the steering assist control, the motor 70 is driven irrespective of the driver's steering operation.

The lane keeping assist apparatus of the present embodiment is an apparatus for assisting the driver's steering operation so as to cause the vehicle to travel along the target travel line and is not an apparatus for automatic driving which does not require the driver's steering operation. Accordingly, the steering torque generated by the motor 70 is set to a value which is enough to alert the driver to the necessity of steering operation; i.e., to a small value. It should be noted that the lane keeping assist apparatus may be configured to cause the vehicle to travel along the target travel line by means of automatic driving.

The driving assist ECU 10 acquires, at predetermined intervals, information representing the steering torque Ts and the steering angle $\theta$s from the steering ECU 90 through the CAN 40.

A vehicle speed sensor 11, an operation switch 12, a camera sensor 13, a display 14, and a buzzer 15 are connected to the driving assist ECU 10. The vehicle speed sensor 11 outputs to the driving assist ECU 10 a detection signal representing the vehicle speed Vx of the vehicle. The operation switch 12 is a switch which is selectively brought into an on state or an off state by the driver so as to determine whether to perform the lane keeping assist control, and outputs a selection signal to the driving assist ECU 10. When the operation switch 12 is in the on state, the lane keeping assist control is performed.

Figure 2:
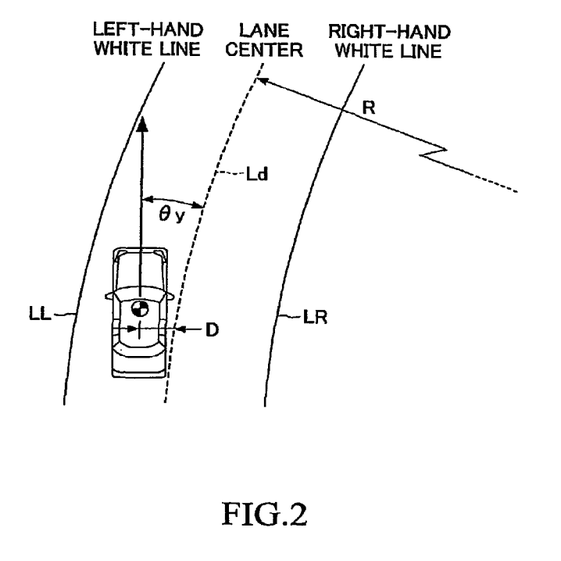
FIG. 2 is an illustration used for describing parameters used for lane keeping assist control.

The camera sensor 13 captures the image of the road ahead of the vehicle and performs image processing on the captured image to thereby recognize lane markers (e.g., white lines) on the left and right sides of the road. On the basis of the lane markers, the camera sensor 13 determines the target travel line along which the vehicle is caused to travel. As shown in FIG. 2, the camera sensor 13 recognizes, for example, a left-hand white line LL and a right-hand white line LR and determines, as the target travel line Ld, a lane center which is the midpoint between the left-hand white line LL and the right-hand white line LR.

Further, the camera sensor 13 calculates the angle of deviation of the heading direction of the vehicle from the direction of the target travel line Ld (hereinafter referred to as "yaw angle $\theta y$"), the amount of deviation (in the width direction) of the position of the center of gravity of the vehicle from the target travel line Ld (hereinafter referred to as "offset D"), the curvature a of a target trace line (hereinafter referred to as "road curvature a"), etc. The camera sensor 13 may calculate a road radius R instead of the road curvature a (=1/R). The camera sensor 13 outputs to the driving assist ECU 10 lane information which represents these calculated values. It should be noted that the amount of deviation (in the width direction) of the position of the center of gravity of the vehicle from the target travel line Ld, which represents the offset D, may be the amount of deviation in the width direction of the vehicle or the amount of deviation in the width direction of the road.

Also, in the case where the camera sensor 13 has the image capturing function only, the driving assist ECU 10 may perform a portion or the entirety of the above-described calculation function of the camera sensor 13 (i.e., some or all of the image processing, the recognition of the lane markers, the determination of the target travel line, the calculation of the yaw angle $\theta y$, the calculation of the offset D, and the calculation of the curvature a).

The display 14 is provided at a position determined such that the driver can view the display 14 while sitting on the driver's seat of the vehicle. The display 14 displays assist control information sent from the driving assist ECU 10 on the screen thereof. In the case where the camera sensor 13 has failed to recognize the lane markers, the case where a system anomaly has been detected, or the like case, the buzzer 15 sounds and notifies the driver of a situation where the lane keeping assist control cannot be performed.

The driving assist ECU 10 of the present embodiment performs the lane keeping assist control over the entire vehicle speed range. The entire vehicle speed range means a vehicle speed range which is used for ordinary vehicle travel and which ranges from a speed of zero to a high vehicle speed. However, the lane keeping assist control is not necessarily required to be performed over the entire vehicle speed range, and may be performed when the vehicle speed is equal to or greater than a very low speed. Also, a vehicle speed upper limit may be provided in the high speed range.

Figure 3:
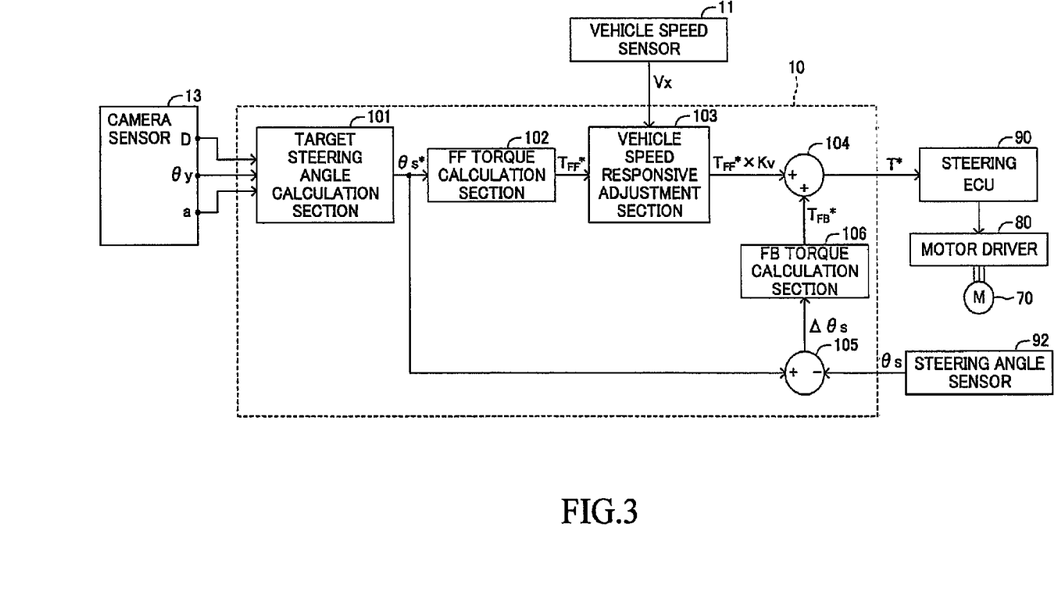
FIG. 3 is a control block diagram relating to the lane keeping assist control.

Next, the lane keeping assist control performed by the driving assist ECU 10 will be described. FIG. 3 is a control block diagram relating to the lane keeping assist control performed by the driving assist ECU 10. The driving assist ECU 10 includes a target steering angle calculation section 101, an FF torque calculation section 102, a vehicle speed responsive adjustment section 103, an adding section 104, a subtracting section 105, and an FB torque calculation section 106. These control blocks 101 to 106 repeatedly perform the below-described calculation processes in parallel at predetermined calculation intervals. Also, for execution of various types of calculations, the driving assist ECU 10 uses various values detected by the sensors. Unless otherwise specified, the values detected by the sensors are the latest values at the time of calculation.

The target steering angle calculation section 101 receives the offset D, the yaw angle $\theta y$, and the road curvature a from the camera sensor 13 and calculates a target steering angle $\theta s^*$ from these values in accordance with the following Equation (1).

$$\theta s^* = K1 \times D + K2 \times \theta y + K3 \times a \quad (1)$$

In Equation (1), each of K1, K2, and K3 is a control gain. The target steering angle $\theta s^*$ is a steering angle set such that the vehicle can travel along the target travel line Ld. It should be noted that the equation used for the calculation of the target steering angle $\theta s^*$ is not limited to the above-described Equation (1), and the calculation of the target steering angle $\theta s^*$ may be performed through use of an arbitrary equation. Also, the control gains K1 to K3 may be values set in accordance with other parameters such as the vehicle speed Vx.

The target steering angle calculation section 101 supplies the calculated target steering angle $\theta s^*$ to the FF torque calculation section 102 and the subtracting section 105.

The FF torque calculation section 102 calculates an FF target steering torque TFF*, which is a feedforward control variable, on the basis of the target steering angle $\theta s^*$. The FF torque calculation section 102 stores an FF torque map having a characteristic shown in FIG. 4, and calculates the FF target steering torque TFF* with reference to the FF torque map. The FF torque map has a characteristic to provide the FF target steering torque TFF* which increases with an increase in the target steering angle $\theta s^*$. The FF torque map has a dead zone determined such that when the target steering angle $\theta s^*$ is close to zero, the FF target steering torque TFF* is set to zero.

Figure 4:
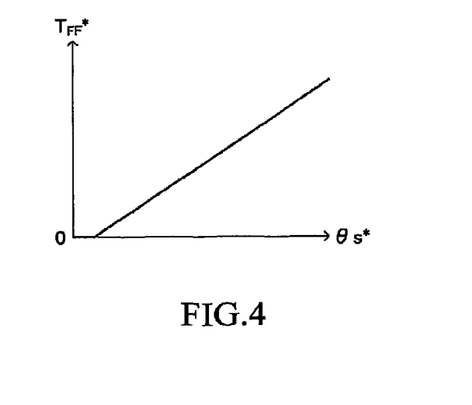
FIG. 4 is a graph showing an FF torque map.

It should be noted that the FF torque map of FIG. 4 shows the FF target steering torque TFF* for the case where the target steering angle $\theta s^*$ assumes a positive value (namely, in the case where a leftward target steering angle $\theta s^*$ is set). In the case where the target steering angle $\theta s^*$ assumes a negative value (namely, in the case where a rightward target steering angle $\theta s^*$ is set), the sign of the FF target steering torque TFF* becomes negative. However, its magnitude (absolute value) is the same as that in the case where the target steering angle $\theta s^*$ assumes a positive value.

The FF torque calculation section 102 supplies the calculated FF target steering torque TFF* to the vehicle speed responsive adjustment section 103.

The vehicle speed responsive adjustment section 103 receives the FF target steering torque TFF* and the vehicle speed Vx detected by the vehicle speed sensor 11. The vehicle speed responsive adjustment section 103 sets a vehicle speed adjustment coefficient Kv on the basis of the vehicle speed Vx and calculates a value (TFF*×Kv) by multiplying the FF target steering torque TFF* by the vehicle speed adjustment coefficient Kv. This calculated value (TFF*×Kv) will be referred to as the adjusted FF target steering torque (TFF*×Kv).

Figure 5:
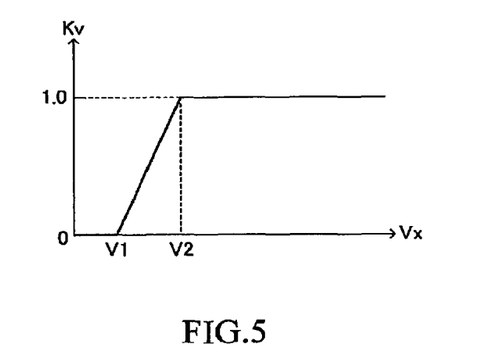
FIG. 5 is a graph showing a vehicle speed adjustment coefficient map.

The vehicle speed responsive adjustment section 103 stores a vehicle speed adjustment coefficient map shown in FIG. 5, and calculates the vehicle speed adjustment coefficient Kv with reference to this vehicle speed adjustment coefficient map. The vehicle speed adjustment coefficient map has a characteristic of setting the vehicle speed adjustment coefficient Kv to 0 when the vehicle speed Vx is lower than a first set vehicle speed V1 and setting the vehicle speed adjustment coefficient Kv to 1 when the vehicle speed Vx is higher than a second set vehicle speed V2 (>V1). Also, the vehicle speed adjustment coefficient map has a characteristic of decreasing the vehicle speed adjustment coefficient Kv from 1 to 0 as the vehicle speed Vx decreases when the vehicle speed Vx is not lower than the first set vehicle speed and not higher than the second set vehicle speed V2 (V1≤Vx≤V2) (in the present embodiment, the vehicle speed adjustment coefficient map has a characteristic of decreasing the vehicle speed adjustment coefficient Kv linearly). The first set vehicle speed V1 and the second set vehicle speed V2 are values set in advance.

The vehicle speed responsive adjustment section 103 calculates an adjusted FF target steering torque (TFF*×Kv) by multiplying the FF target steering torque TFF* by the vehicle speed adjustment coefficient Kv set in the above-described manner and outputs the calculation result to the adding section 104. The adjusted FF target steering torque (TFF*×Kv) represents the final value of the feedforward control variable. Accordingly, the vehicle speed responsive adjustment section 103 outputs the value of "0" as the feedforward control variable when the vehicle is traveling at a speed lower than the first set vehicle speed V1, and outputs the FF target steering torque TFF* as is, as the feedforward control variable, when the vehicle is traveling at a speed higher than the second set vehicle speed V2. Also, when the vehicle is travelling at a speed not lower than the first set vehicle speed V1 and not higher than the second set speed V2, the vehicle speed responsive adjustment section 103 outputs, as the feedforward control variable, the value (TFF*×Kv) obtained by adjusting the FF target steering torque TFF* through use of the vehicle speed adjustment coefficient Kv such that the FF target steering torque TFF* decreases.

The subtracting section 105 receives the target steering angle θs* supplied from the target steering angle calculation section 101 and the steering angle θs detected by the steering angle sensor 92 (hereinafter referred to as the actual steering angle θs) and calculates a steering angle deviation Δθs (=θs*−θs) which is the difference between the target steering angle θs* and the actual steering angle θs. The subtracting section 105 supplies the calculated steering angle deviation Δθs to the FB torque calculation section 106.

The FB torque calculation section 106 calculates an FB target steering torque TFB*, which is a feedback control variable, on the basis of the steering angle deviation Δθs. The FB torque calculation section 106 calculates the FB target steering torque TFB* using, for example, a PID control equation, a PI control equation, a P control equation, or a like equation, each of which includes the steering angle deviation Δθs as a proportional term.

The FB torque calculation section 106 supplies the calculated FB target steering torque TFB* to the adding section 104.

The adding section 104 receives the FB target steering torque TFB* supplied from the FB torque calculation section 106 and the adjusted FF target steering torque (TFF*×Kv) supplied from the vehicle speed responsive adjustment section 103 and calculates a final target steering torque T*(=TFB*+TFF*×Kv) by adding the FB target steering torque TFB* and the adjusted FF target steering torque (TFF*×Kv) together.

The adding section 104 sends the lane keeping torque command which contains information representing the calculated final target steering torque T* to the steering ECU 90 through the CAN 40.

Upon receipt of the lane keeping torque command, the steering ECU 90 converts the final target steering torque T*, which is the information contained in the lane keeping torque command, to a target current, and controls the operation of the motor driver 80 such that the target current flows to the motor 70. A current sensor (not shown) for detecting the current flowing to the motor 70 is provided in the motor driver 80. The steering ECU 90 controls the duty ratio of a switching device (not shown) of the motor driver 80 such that the actual current detected by the current sensor becomes equal to the target current. Thus, the final target steering torque T* is output from the motor 70, whereby the steerable wheels W are steered. As a result, the driver's steering operation can be assisted so as to cause the vehicle to travel along the target travel line Ld.

The lane keeping assist apparatus of the present embodiment has the vehicle speed responsive adjustment section 103 which adjusts the feedforward control variable in accordance with the vehicle speed so as to properly perform the lane keeping assist control not only at the time of high speed travel but also at the time of low speed travel. The reason why the vehicle speed responsive adjustment section 103 is provided will be described.

Figure 6:
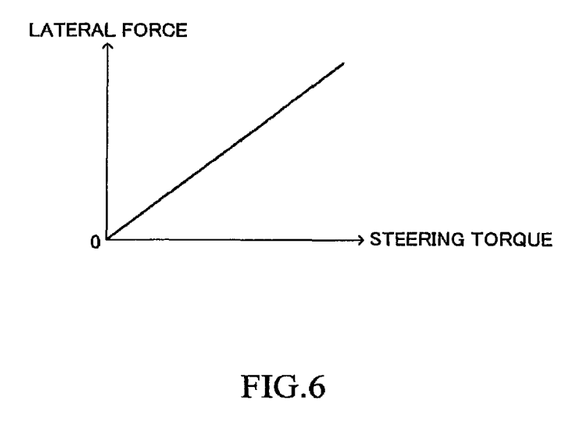
FIG. 6 is a graph showing the relation between steering torque and lateral force during high speed travel.

In the lane keeping assist control, the driver's steering operation is assisted by applying a small steering torque so as to adjust the heading direction of the vehicle such that the vehicle travels near the target travel line. The heading direction of the vehicle can be adjusted mainly by generating a lateral force (lateral acceleration) at each of the tires of the steerable wheels W. This lateral force is generated when a steering torque is applied to the steering mechanism 60 to thereby steer the steerable wheels W. At time of high speed travel, as shown in FIG. 6, the lateral force changes substantially linearly with the steering torque. Accordingly, by calculating the FF target steering torque TFF* corresponding to the target steering angle θs*, a desired lateral force can be generated through feedforward control.

However, at the time of low speed travel, the slip angle becomes smaller than that at the time of high speed travel. Also, self-aligning torque becomes hard to generate. Accordingly, the mechanism in which the lateral force is generated due to the steering torque changes between the case of high speed travel and the case of low speed travel, and at the time of low speed travel, the lateral force does not change linearly with the steering torque. Therefore, even if the FF target steering torque TFF* corresponding to the target steering angle θs* is calculated, proper feedforward control cannot be performed through use of the result of the calculation.

In view of the above, at the time of low speed travel during which the vehicle speed Vx is lower than the first set vehicle speed V1, the vehicle speed responsive adjustment section 103 sets the feedforward control variable (the adjusted FF target steering torque (TFF*×Kv)) to zero as described above. In this case, the motor 70 is driven and controlled by the FB target steering torque TFB*, which is the feedback control variable, on the basis of the steering angle deviation Δθs. Therefore, the actual steering angle θs can be made closer to the target steering angle θs*, and a proper steering torque can be generated by the motor 70. Feedback control is inferior in responsiveness to feedforward control. However, at the time of low speed travel, the required responsiveness is lower than that at the time of high speed travel. Therefore, the lane keeping assist control can be performed well without any problem.

Also, at the time of high speed travel during which the vehicle speed Vx is higher than the second set vehicle speed V2, the vehicle speed responsive adjustment section 103 outputs the FF target steering torque TFF* as is as the feedforward control variable. Accordingly, the lane keeping assist control can be performed well by both of feedforward control which is high in responsiveness and feedback control (hereinafter referred to as "FF+FB control").

Also, in the case where the vehicle speed Vx is not lower than the first set vehicle speed V1 and not higher than the second set vehicle speed V2 (V1≤Vx≤V2), the vehicle speed responsive adjustment section 103 outputs, as the adjusted FF target steering torque, the value (TFF*×Kv) obtained by multiplying the FF target steering torque TFF* by the vehicle speed adjustment coefficient Kv which decreases as the vehicle speed Vx decreases. Accordingly, at the time of transition from the FF+FB control to the feedback control and at the time of transition from the feedback control to the FF+FB control, the control mode can be switched smoothly without causing a large variation in the final target steering torque T*. Accordingly, it is possible to prevent the driver from feeling an unnatural sensation.

As having been described, the lane keeping assist apparatus of the present embodiment can perform the lane keeping assist control well over the entire vehicle speed range.

The lane keeping assist apparatus of the present embodiment has been described. However, the present invention is not limited to the above-described embodiment and modified embodiments, and various modifications are possible without departing from the scope of the invention.

For example, in the present embodiment, the lane keeping assist apparatus has the rack-assist-type electric power steering section 50 in which the motor 70 is assembled to the rack bar 64. However, in place of the rack-assist-type electric power steering section, the lane keeping assist apparatus may have a column-assist-type electric power steering section in which a motor is assembled to the steering shaft 62.

In the present embodiment, the steering angle sensor 92 detects the rotational angle of the steering shaft 62. However, the steering angle sensor 92 may detect the steering angle on the basis of, for example, the axial position of the rack bar.

What is claimed is:

1. A lane keeping assist apparatus for assisting driver's driving by causing a steering mechanism to generate steering torque so as to cause a vehicle on which the apparatus is mounted to travel along a target travel line, wherein the lane keeping assist apparatus comprises:

target steering angle calculation means configured to calculate a target steering angle for causing the vehicle to travel along the target travel line;

feedforward control variable calculation means configured to calculate, on the basis of the target steering angle, an FF target steering torque which is a feedforward control variable adapted to high speed travel;

steering angle detection means configured to detect an actual steering angle of the vehicle;

feedback control variable calculation means configured to calculate, on the basis of a deviation of the actual steering angle from the target steering angle, an FB target steering torque which is a feedback control variable;

vehicle speed detection means configured to detect a vehicle speed of the vehicle;

feedforward control variable adjustment means configured to adjust the FF target steering torque such that at a time of low speed travel during which the vehicle speed is low, the FF target steering torque becomes smaller than the FF target steering torque at a time of high speed travel during which the vehicle speed is high;

final control variable calculation means configured to calculate a final target steering torque on the basis of the adjusted FF target steering torque and the FB target steering torque; and torque generation means configured to cause the steering mechanism to generate the final target steering torque.

2. The lane keeping assist apparatus according to claim 1, wherein the feedforward control variable adjustment means sets the FF target steering torque to zero when the vehicle speed is lower than a set vehicle speed.

* * * * *